US008266996B2

(12) United States Patent
Thomas et al.

(10) Patent No.: US 8,266,996 B2
(45) Date of Patent: Sep. 18, 2012

(54) ADJUSTABLE FENCE ASSEMBLY FOR A MITER SAW

(75) Inventors: Adam Thomas, Aurora, IL (US); Kenneth N. Svetlik, Schaumburg, IL (US)

(73) Assignee: Robert Bosch GmbH, Stuttgart (DE)

(*) Notice: Subject to any disclaimer, the term of this patent is extended or adjusted under 35 U.S.C. 154(b) by 530 days.

(21) Appl. No.: 12/220,347

(22) Filed: Jul. 24, 2008

(65) Prior Publication Data

US 2010/0018372 A1 Jan. 28, 2010

(51) Int. Cl.
*B23D 45/04* (2006.01)

(52) U.S. Cl. ............................ 83/468.2; 83/473; 83/490

(58) Field of Classification Search ................. 83/468.2, 83/468.7, 490, 473, 471.3
See application file for complete search history.

(56) References Cited

U.S. PATENT DOCUMENTS

| | | | | |
|---|---|---|---|---|
| 5,042,348 | A * | 8/1991 | Brundage et al. | 83/471.3 |
| 5,181,448 | A | 1/1993 | Terpstra | |
| 5,755,148 | A | 5/1998 | Stumpf et al. | |
| 5,819,619 | A | 10/1998 | Miller et al. | |
| 5,943,931 | A | 8/1999 | Stumpf et al. | |
| 5,957,022 | A | 9/1999 | Stumpf et al. | |
| 6,425,309 | B1 | 7/2002 | Stumpf et al. | |
| 6,427,570 | B1 | 8/2002 | Miller et al. | |
| 6,899,005 | B1 | 5/2005 | O'Banion et al. | |
| 7,543,522 | B2 * | 6/2009 | Chen | 83/490 |

* cited by examiner

*Primary Examiner* — Kenneth E. Peterson
(74) *Attorney, Agent, or Firm* — Greer, Burns & Crain, Ltd.

(57) ABSTRACT

Embodiments of the invention comprise an adjustable fence assembly for use with a power tool, that further comprise an elongated lower fence for attachment to the power tool, the lower fence having a base with an upper support and locking surface configuration extending along a substantial portion of the length of the base and a vertical front face for positioning a work piece, an elongated upper fence having a bottom surface configuration for engaging the surface configuration of the lower fence, the upper fence being releasably attached to the lower fence and adjustable relative to the lower fence along its lengthwise direction, and a locking mechanism carried by the lower fence and operatively connected to the upper fence for selectively applying at least a downward force and a face biasing force for securing the upper fence to the lower fence.

23 Claims, 6 Drawing Sheets

ADJUSTABLE FENCE ASSEMBLY FOR A MITER SAW

BACKGROUND OF THE INVENTION

The present invention generally relates to miter saws, and more particularly to an adjustable fence assembly for a miter or similar saw.

Most power miter saws that are presently being commercialized are capable of cutting work pieces at different miter angles as well as bevel angles. While all miter saws have a fence for positioning a work piece to be cut, the configuration of the fence can have various designs and capabilities. Since some miter saws have a bevel angle that can be adjusted from a straight cut to bevel angled cuts on one or both sides of vertical orientation, the design of the fence must be able to accommodate such capability.

Many current miter saws also have a compound action whereby the blade and motor assembly can be physically moved relative to the table in a direction parallel with the plane of the blade, rather than just a pivoting or chop saw type of cutting action. With such compound motion, the blade and motor assembly will move from a rearward position to one forwardly of it either preparatory to the cut or during the cut. The fence must therefore be configured for these types of saws as well as saws that do not have compound motion capability to enable the blade and motor assembly to be operated through its range of motion without interference. It is also common place for current miter saws to have a lower fence on both sides of the blade. Because it is desirable to have a fence with some appreciable height, both regular and compound miter saws often have at least one upper upper fence that is attached on top a lower generally lower fence. The upper fence adds height to the lower fence and can also be adjusted to be closer to the blade for transverse cuts and can be moved away from the blade so that the blade and motor assembly can be adjusted for making miter angled cuts without interference with the upper fence.

An important consideration is that the front face of the upper fence be coplanar with the front face of the lower fence to a high degree of accuracy when they are secured to one another and that they do not become out of square when the attachment mechanism is tightened. It is also important that the upper fence section be easily removed so that extreme compound angled cuts can be made that would otherwise not be possible.

SUMMARY OF THE INVENTION

Embodiments of the invention comprise an adjustable fence assembly for use with a power tool, that further comprise an elongated lower fence for attachment to the power tool, the lower fence having a base with an upper support and locking surface configuration extending along a substantial portion of the length of the base and a vertical front face for positioning a work piece, an elongated upper fence having a bottom surface configuration for engaging the surface configuration of the lower fence, the upper fence being releasably attached to the lower fence and adjustable relative to the lower fence along its lengthwise direction, the upper fence having a front face that is substantially coplanar with the front face of the lower fence when secured thereto, and a locking mechanism carried by the lower fence and operatively connected to the upper fence for selectively applying at least a downward force and a face biasing force for securing the upper fence to the lower fence in a manner whereby a coplanar relationship of the front faces of the upper and lower fence is substantially assured.

DESCRIPTION OF THE PREFERRED EMBODIMENTS

Embodiments of the present invention are particularly appropriate for use with power miter saws. However, it should be appreciated that the present invention may be used with non-powered miter saws or with other tools where a fence is used to position or guide the movement of a work piece in connection with cutting, shaping or other operation.

While fence assemblies having adjustable upper fences that attach to a lower fence are used on many currently available miter saws, including compound miter saws, a frequent problem of such upper fences that are attached to a lower fence is that they tend to go out of square when the tightening mechanism is tightened too much or they are designed so that the upper fence cannot be quickly removed from the lower fence. Such removal is often required for making cuts at extreme compound angles. Embodiments of the present invention enable quick removal of a upper fence from a lower fence and also have the capability of firmly tightening the upper fence to the lower fence without causing the fences to go out of square relative to one another as a result of the tightening process.

Figure 1:
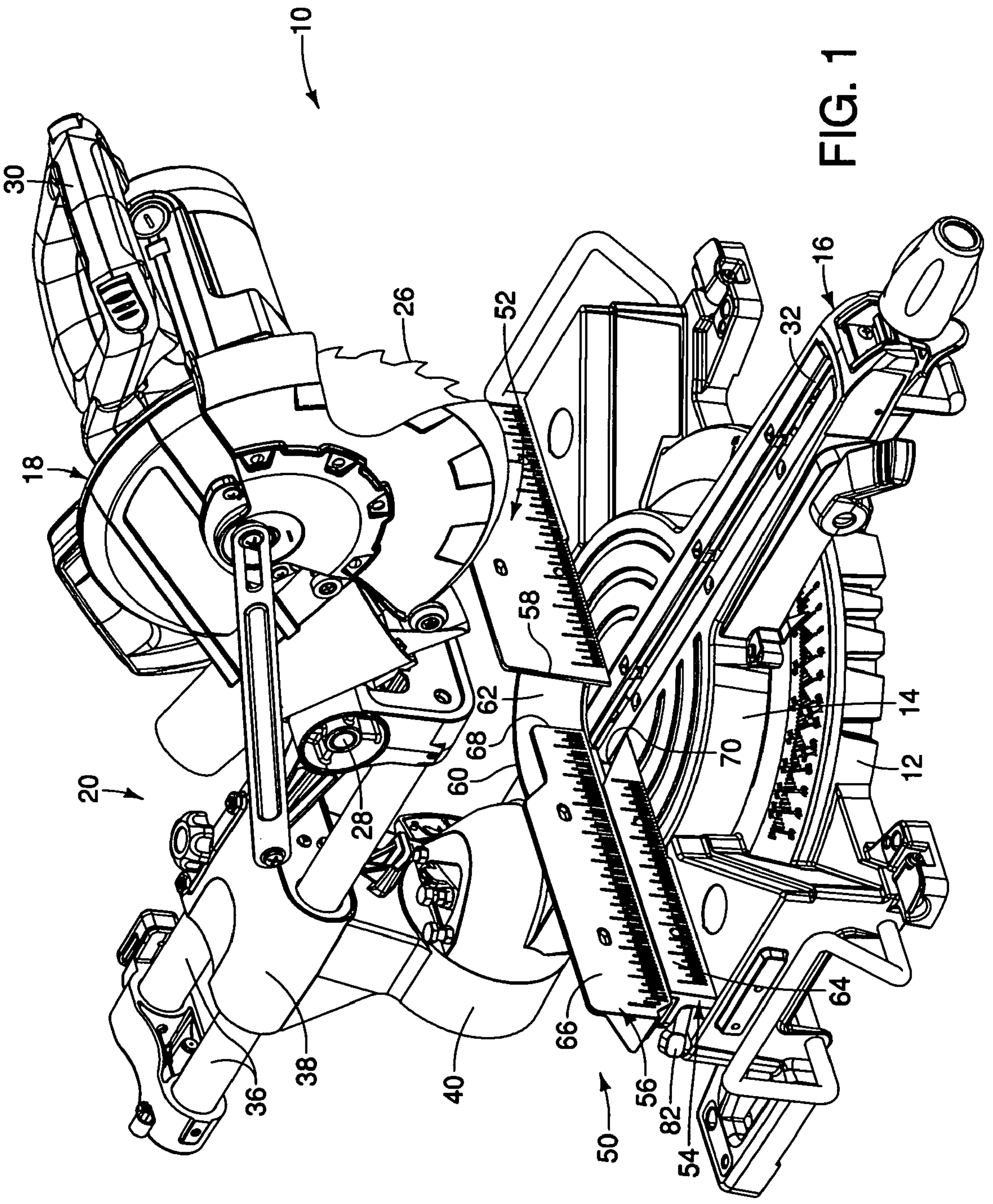
FIG. 1 is a front left perspective view of a compound miter saw having an adjustable fence assembly embodying the present invention.
Figure 2:
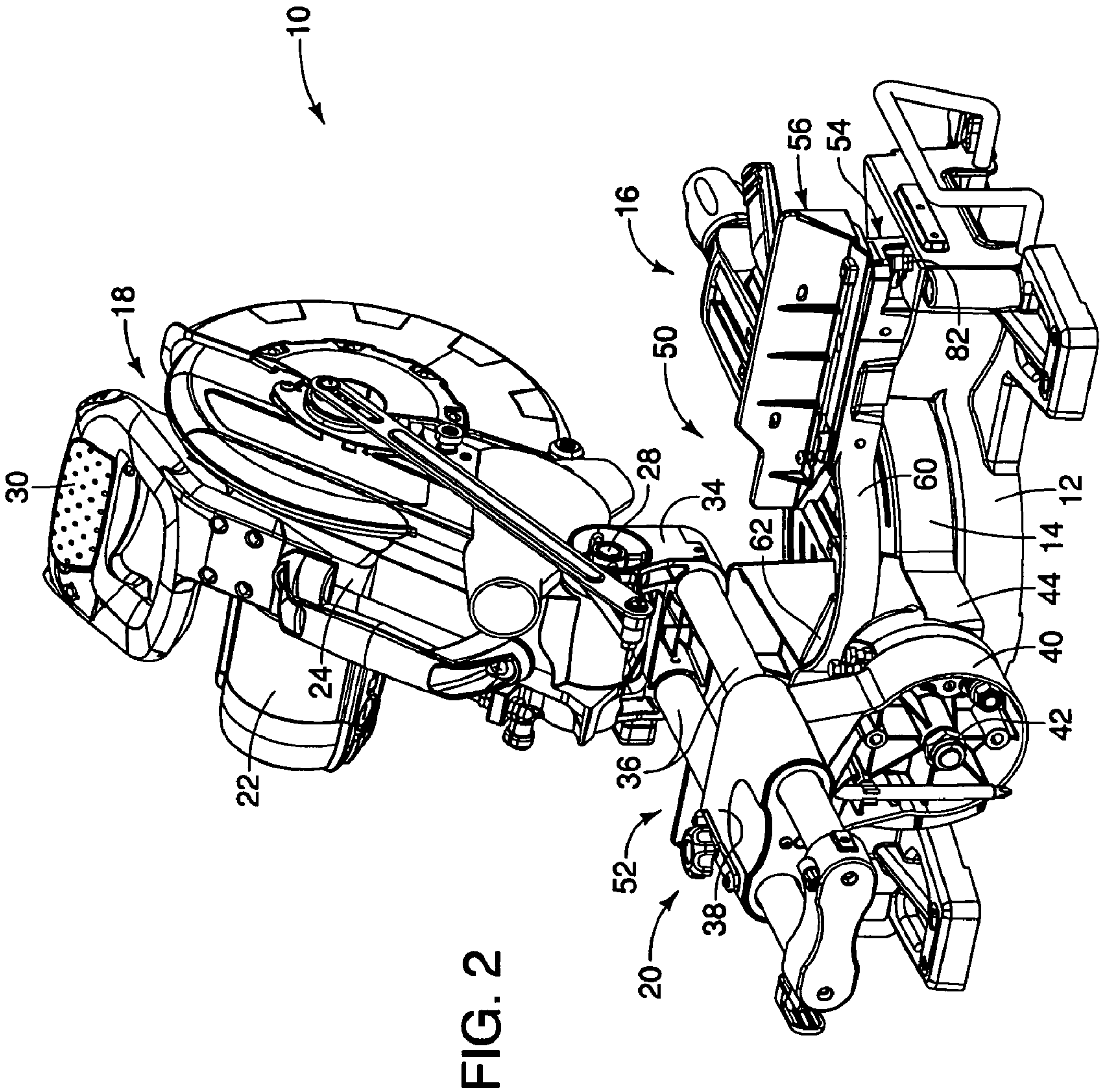
FIG. 2 is a left rear perspective view of the compound miter saw shown in FIG. 1.

Turning now to the drawings, and particularly FIGS. 1 and 2, a miter saw, indicated generally at 10, has a base 12 with a generally circular portion on which a rotatable table 14 is attached. A miter arm control assembly, indicated generally at 16, is either integrally formed with the rotatable table 14 or is attached to it and is provided for adjusting the horizontal angular position of the table 14 for setting the miter angle for cutting a work piece that would be placed on the table 14.

A saw blade and motor assembly, indicated generally at 18, is operatively connected to the table 14 by a linear guide mechanism, indicated generally at 20. The saw blade and motor assembly 18 has an electric motor 22 that is operatively connected through a gear mechanism that drives a saw blade 26, the gear mechanism not being shown but located within a housing portion 24. The blade and motor assembly 18 is pivotable about a horizontal shaft 28. A handle 30 is provided for use by an operator to bring the blade and motor assembly 18 from a rest position shown in FIGS. 1 and 2 where it is elevated relative to the table to a lowered cutting position if a work piece is placed on the table 14.

The miter arm control assembly 16 has a slot 32 that extends across the table 14 and enables the blade 26 to be lowered to a position below the top surface of the table 14 so that the blade can cut completely through the work piece during a cutting operation. The linear guide mechanism 20 has a pivot head 34 to which the shaft 28 is mounted and the pivot head 34 is connected to a pair of rods 36 that are slidable in a support frame 38 to provide a compound miter type of operation. The support frame 38 has a bottom portion 40 that is attached to and is pivotable around a bevel pivot shaft 42 that is supported by a rear portion 44 of the table 14.

From the foregoing it should be understood that the support frame 38 which carries the linear guide mechanism 20 as well as the blade and motor assembly 18 will pivot around the bevel pivot shaft 42 for the purpose of orienting the blade 26 at the appropriate bevel angle for making bevel cuts on a work piece that may be placed on the table 14. The saw shown in FIGS. 1 and 2 is in a neutral position where vertical cuts are made.

During operation, an operator places a work piece on the table 14, brings the handle 30 down into cutting position after activating the motor 22 and makes a chop cut on the work piece. However, if the work piece to be cut is wide, the operator will typically use the handle 30 to pull the blade and motor assembly forwardly to some forward position where the work piece will be engaged, activated the motor and bring the handle down into a cutting position, and then push the handle 30 toward the work piece to cut it.

An adjustable fence assembly, indicated generally at 50, is provided to correctly position a work piece relative to the blade 26. The fence 50 is shown to comprise a rightward stationary fence 52, a lower fence 54, and an adjustable and removable upper fence 56 that is attached to the lower fence 54. As best shown in FIG. 1, the right stationary fence 52 is higher and its left end 58 is generally perpendicular or vertical relative to the table top surface 14. The significance of this is that the illustrated miter saw is designed so that the miter saw has a single bevel operation as opposed to a dual bevel operation, meaning that the bevel angle can be adjusted only to the left as shown in FIG. 1 from the normal or zero angle or position where the plane of the blade 26 is perpendicular to the plane of the top surface of the table 14.

It should be appreciated that if the saw 10 were a dual bevel operating saw, the right stationary fence 52 would likely be lower and may have an upper fence attached thereto and the angle of the end 58 would be slanted to the right as shown from the front view of FIG. 1. The fence assembly 50 is preferably designed so that the left and right stationary fences 52 and 54 are cast as a metal unit, with the two fences being interconnected by a curved bridge portion 60. The bridge portion 60 has a front curved upper surface 62 that is designed to enable the blade and motor assembly to be moved rearwardly so that the blade 26 can cut through a work piece immediately forward of the fences without contacting the bridge portion 60.

The lower fence 54 has a front surface 64 and the upper fence 56 has a front face 66. The front faces 64 and 66 are substantially coplanar to a high degree of accuracy so that the accuracy of cuts made with the saw is not compromised because of misalignment of the front faces 64 and 66.

Figure 4:
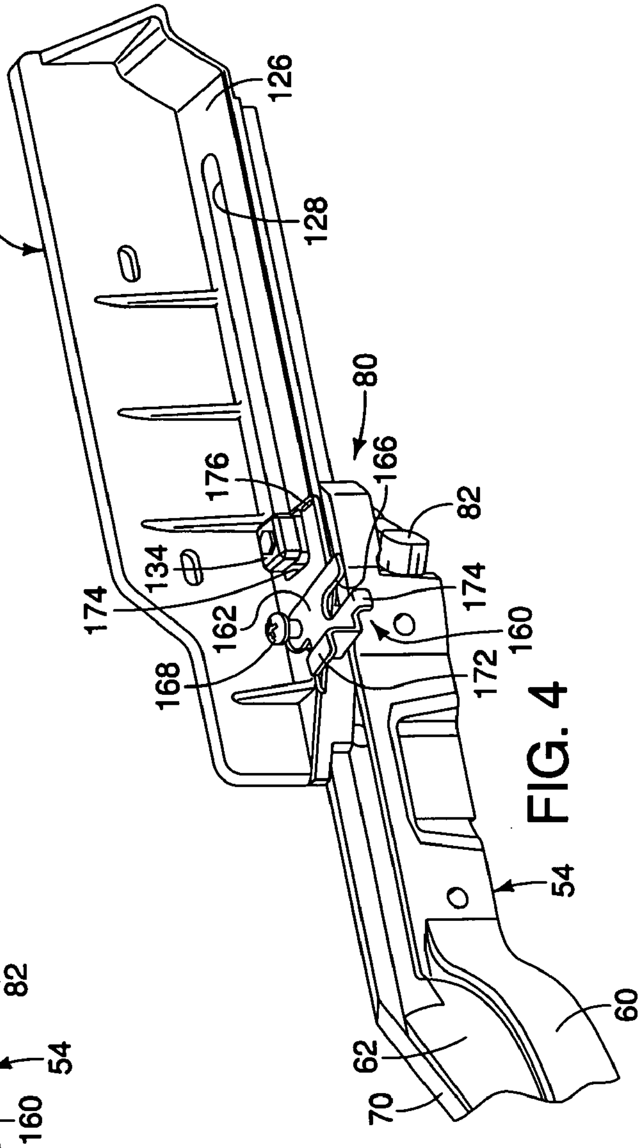
FIG. 4 is a perspective view similar to FIG. 3 but illustrating a cover plate in a position that permits removal of the upper fence from the lower fence.
Figure 3:
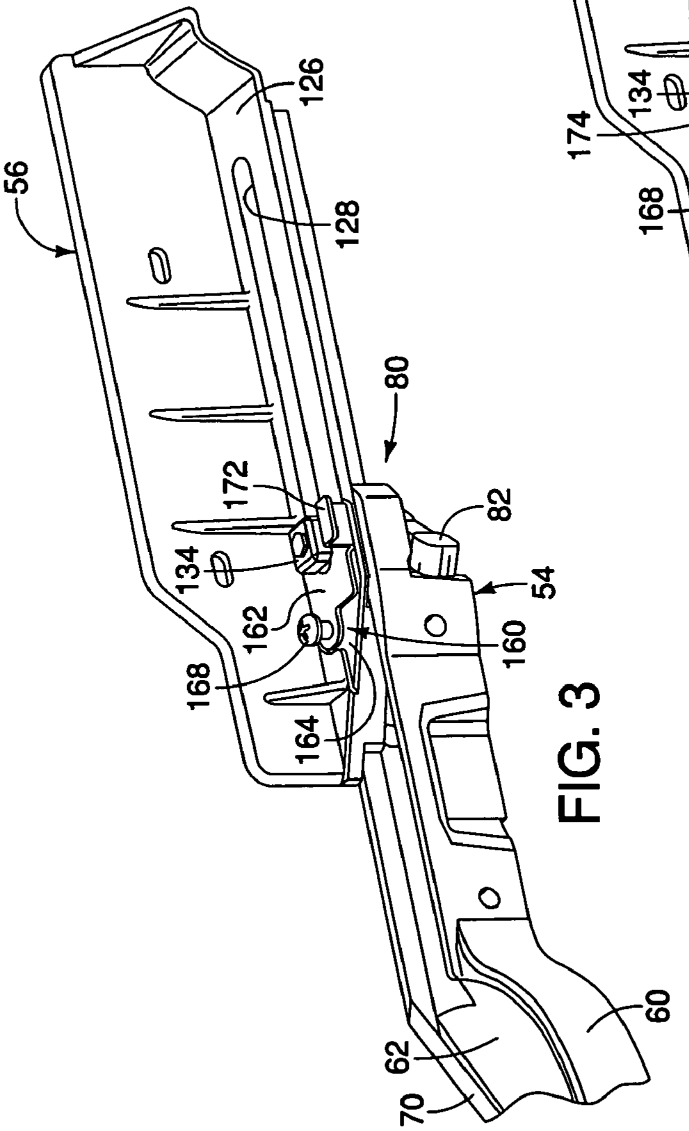
FIG. 3 is a left rear perspective view of a portion of the adjustable fence assembly illustrating the adjustable upper fence being shown in its outwardly extended position, and a cover plate in a position that prevents separation of the upper fence from the lower fence.

As previously mentioned, the upper fence 56 can be adjusted and is designed be slidable relative to the lower fence 54 from the position shown in FIGS. 1 and 2 where its right end 68 is close to the plane of the blade 26 but not interfering with it. The upper fence 56 can also be extended away from the blade a substantial distance as shown in FIGS. 3 and 4. The lower fence 54 has an angled inner end surface 70 which is designed to permit the linear guide mechanism 20 to rotate about the bevel pivot shaft 42 to make extreme bevel cuts without interference.

The adjustable fence assembly 50 has a locking mechanism, indicated generally at 80, which includes a locking lever 82 that can be manipulated to release the locking mechanism so that the upper fence 56 can be adjusted relative to the lower fence 54. In this regard, the lever 82 is shown in an unlocked position in FIGS. 1 and 2 and in a locked position in FIGS. 3, 4, and 5.

The locking mechanism 80 comprises the lever 82 and a hub structure 84 with a generally cylindrical inner chamber 86 that has a lower annular shelf 88 as well as an annular space 90 with an aperture 92 in which a cylindrical shank 94 of a bolt, indicated generally at 96, is located. The bolt 96 has reverse threads 98 which engage complimentary threads 100 of the hub 84. By using reverse threads, the lever 82 will be tightened when moved to the left as shown in FIGS. 3 and 4 and will not be sticking out to possibly interfere with the operation of the saw. The lower fence 54 has a boss 102 that is generally cylindrically shaped and extends downwardly from a main portion 104 that is cast as a single piece, with a front wall 106 having the front surface 64.

The main portion 104 has an elongated channel defined by a rear face 108 of the front wall 106, a facing wall 110 and a bottom shelf 112 that extends between the spaced walls 106 and 108. The adjustable fence 56 has a front wall 114 with its front face 66, the front wall 114 extending from a main portion 116 that has a recess defined by a vertical face 118 and a horizontal face 120 located near the front wall 114 and a second rear recess defined by a vertical face 122 and horizontal face 124. The top surface 126 of the main portion 116 is slanted upwardly from the left to the right where it interfaces with the front wall 114.

Figure 7:
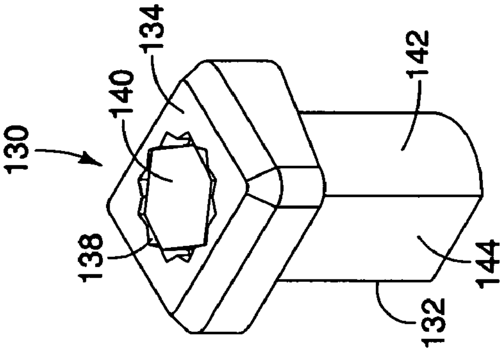
FIG. 7 is a perspective view of the sleeve of the adjustable fence assembly and shown with a bolt in place.
Figure 8:
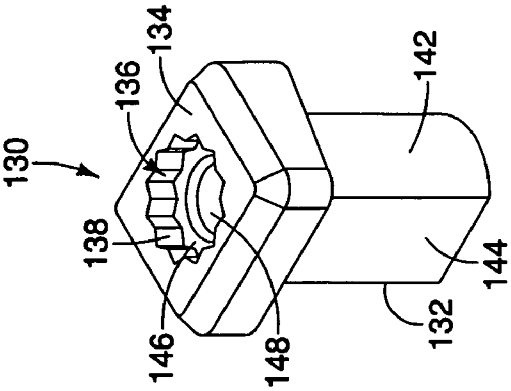
FIG. 8 is a perspective view of the sleeve shown in FIG. 7.
Figure 6:
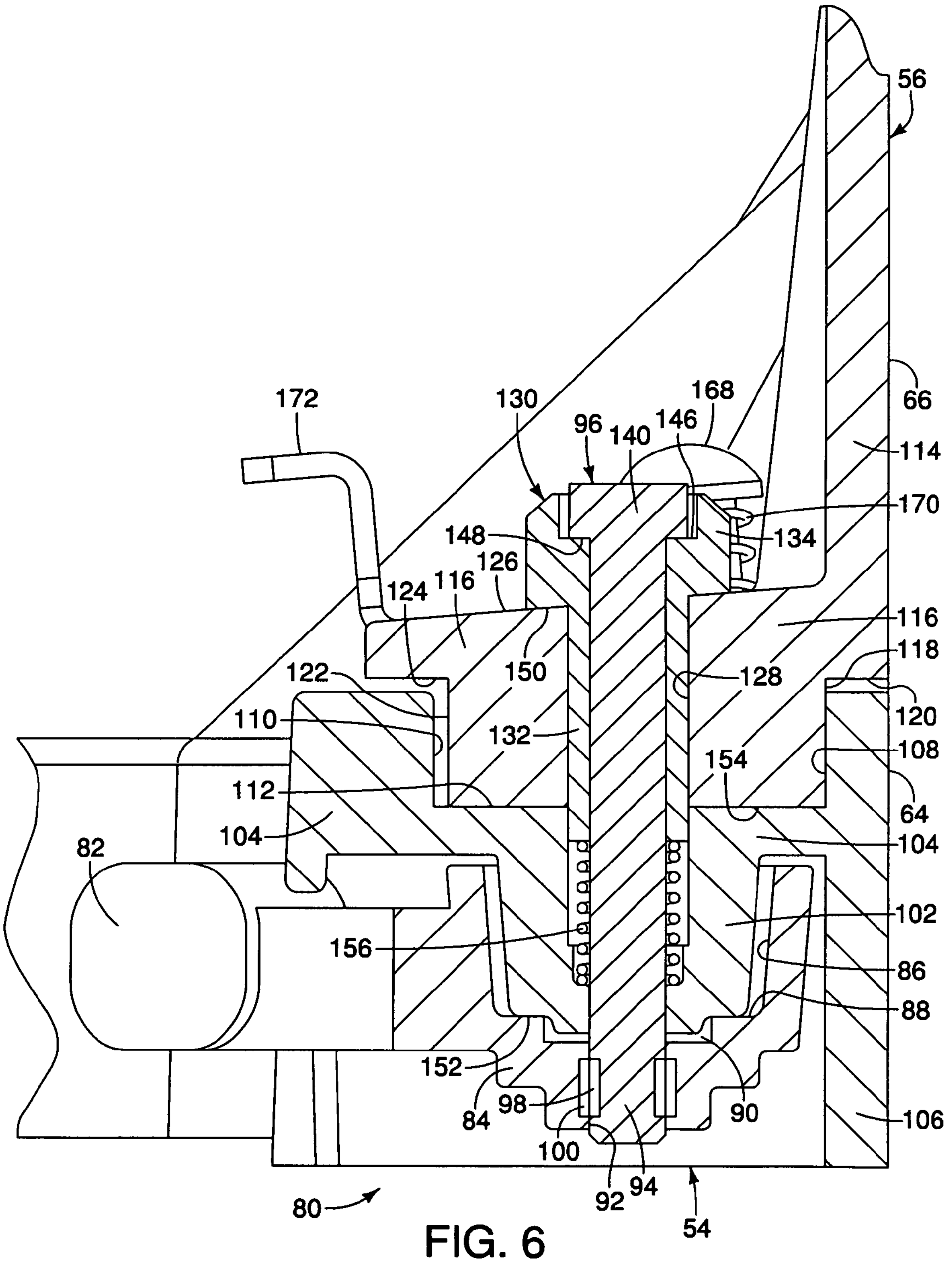
FIG. 6 is a cross section taken generally along the line 6-6 of FIG. 5.

The main portion 116 includes an elongated slot 128 which is sized and configured to receive a sleeve, indicated generally at 130, which has a shank portion 132 that is slideable in the slot 128. Referring to FIGS. 7 and 8, the sleeve has an enlarged generally rectangular top configuration that has an aperture 136 with sidewalls 138 that define a 12 point socket for receiving a hexagonal head 140 of the bolt 96 as best shown in FIG. 7. The shank 132 has curved opposite end portions 142 and flat sides 144, the distance between which is only slightly less that the width of the slot 128 in the main portion 116 of the adjustable frame portion 56. The shank 132 also fits within a similarly shaped opening in the boss 102, which preferably has closer tolerances than in the slot 128 in the upper fence. This is designed so that the resistance to rotation of the sleeve 130 is provided by the lower fence structure. Also, by having the lower fence maintain the angular orientation of the sleeve 130, the upper fence can be easily removed and replaced, inasmuch as the sleeve 130 will always be correctly angularly positioned relative to the slot 128. As shown in FIG. 8, the aperture 136 has an annular shelf 146 which surrounds an aperture 148 which is sized to receive the cylindrical shank 94 of the bolt 96. As shown in FIG. 6, the underside of the hex head 140 defines an annular flange 148 that contacts the annular shelf 146 of the sleeve 130. A bottom surface 150 of the top portion 134 of the sleeve is also similarly angled as the top surface 126 of the main portion 116.

The boss 102 on the lower fence 54 has an annular shelf 152 that is in position to contact the shelf 88 of the lever 82. Care is taken to assure that the annular shelves 88 and 152 are accurately formed or ground to be perpendicular to the true axis of the bolt 96. Similarly, the annular shelf 146 and flange 148 are parallel to the shelves 88 and 152. Therefore, when the lever 82 is rotated to pull the bolt 96 downwardly, the forces are applied in the direction of the axis of the bolt and this causes the head of the bolt to pull down on the sleeve 130 in a manner whereby there is a face biasing force tending to move the upper fence 56 to the right.

Also, the bottom shelf 112 of the lower fence 54 is also formed or ground to be perpendicular to the front face 64 and the bottom surface 154 of the main portion 116 of the adjustable fence 56 is also accurately perpendicular to the front face 66 thereof. When the upper fence 56 is tightened in place, the bottom surface 154 is in contact with the bottom shelf 112 which correctly orients the front faces 64 and 66 so that they are coplanar to one another to a high degree of accuracy. This is achieved by virtue of the close tolerances between the rear face 108 of the front wall 106 of the lower fence 54 and the vertical face 118 of the main portion 116 of the upper adjustable fence 56.

Stated in other words, because the bolt 96 pulls the sleeve down and due to its angular orientation of the surface 150 that contacts the top surface 126, a face biasing force is produced which causes the fence 56 to move forwardly so that the surfaces 108 and 118 are in close contact.

When the lever 82 is placed in its unlocked position, the bolt 96 and sleeve 130 are free to move upwardly and a compression spring 156 is provided to urge the sleeve 130 upwardly so that the fence 56 is free to slide one way or another if desired. The sliding movement is possible because of the fact that the shank 132 of the sleeve can slide in the elongated slot 128 when the fence 56 is moved, as is evident from FIGS. 3, 4, and 5.

Figure 5:
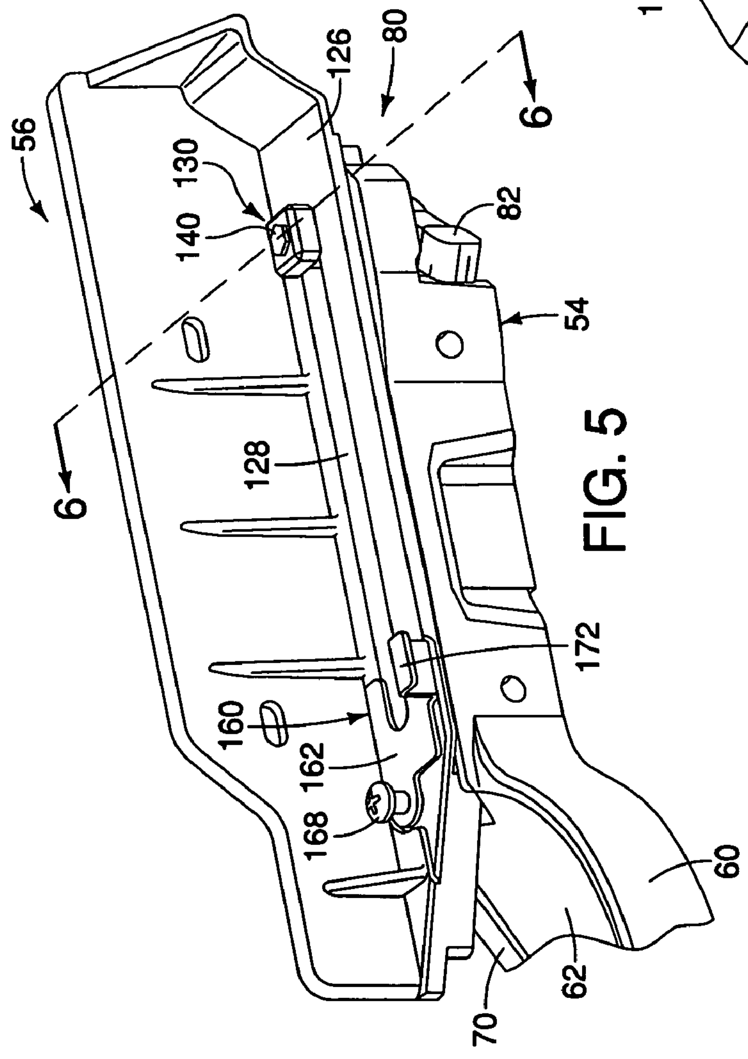
FIG. 5 is a perspective view similar to FIG. 3 but illustrating the adjustable fence in its fully retracted position, with a cover plate in a position preventing separation of the upper fence from the lower fence.

A desirable attribute of the adjustable fence assembly 50 is the fact that the upper adjustable fence 56 can be easily removed from the lower fence 54. Also desirable is the fact that it cannot be removed without a conscious manipulation to do so. In this regard, the head 134 of the sleeve 130 is wider than the slot 128 and a cover plate, indicated generally at 160, is preferably provided at the left end of the fence 56 as shown in FIGS. 3, 4, and 5. The cover plate 160 has a flat central portion 162 of relatively small thickness that fits within a comparable recess 164 in the top surface 126 of the upper fence 54 so that the top surface of the flat central portion 162 is coextensive with the bulk of the surface 126. The cover plate 160 also has a slot 166 that has a width substantially the same as the width of the slot 128. Therefore, when the cover plate 160 is in locking position as shown in FIG. 3, the top portion 134 retains the fence 56 so that it cannot be vertically lifted from the fence 54.

Figure 9:
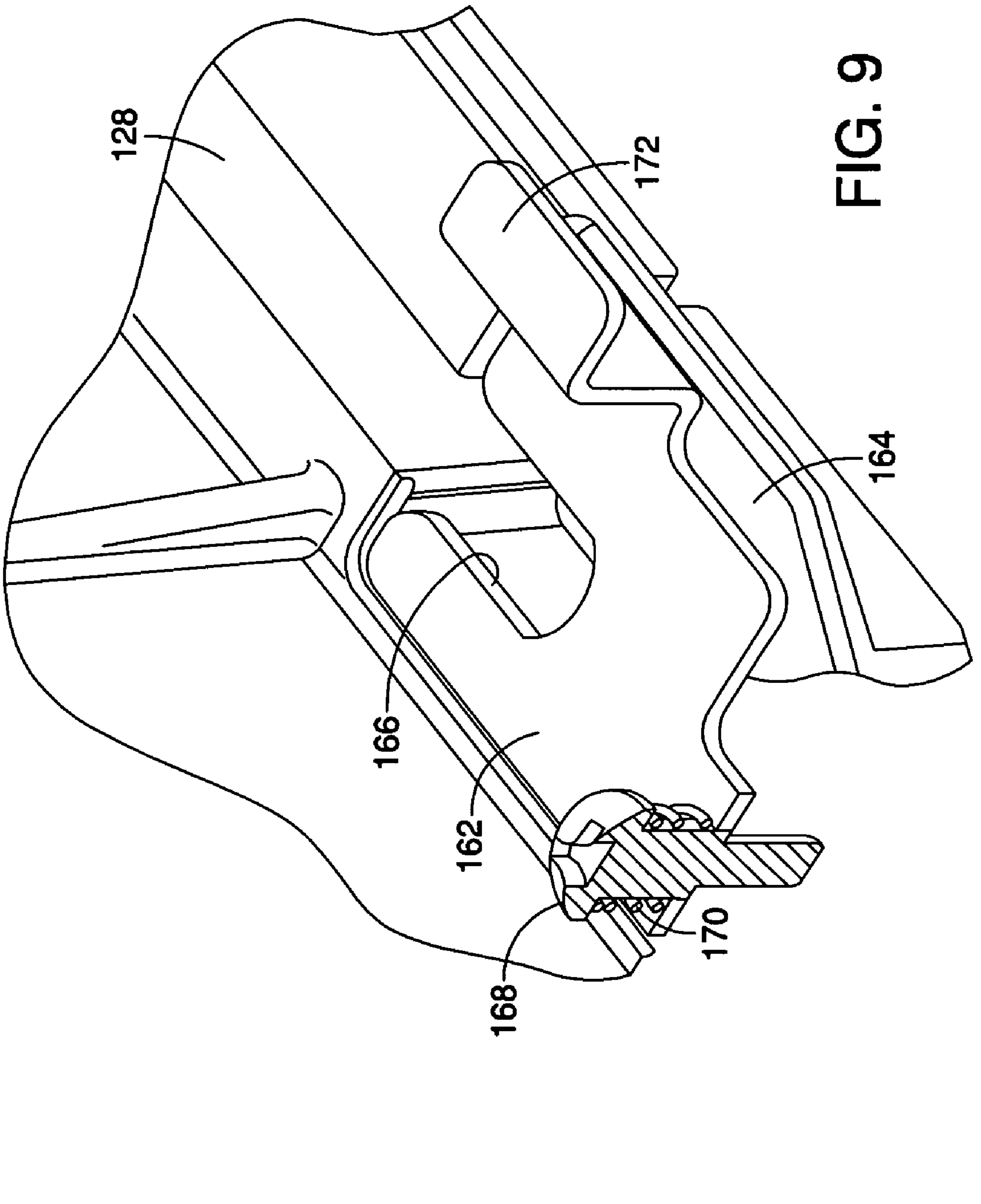
FIG. 9 is a perspective view of the cover plate shown in connection with the adjustable fence assembly shown in its locking position and an attachment mechanism shown in section.

The cover plate 160 is retained by a screw 168 that is secured to the fence 56 and also has a compression spring 170 provided between the underside of the head of the screw 168 and the cover plate 160 as best shown in FIG. 9. This provides a resilient holding force for the cover plate 160 and also provides a pivot point for about which the cover plate 160 can be rotated. The cover plate 160 also has a raised handle portion 172 which enables a user to easily grip the cover plate and rotate the same. When this is done and as shown in FIG. 4, the cover plate exposes a preferably rectangular opening 174 that is sized larger than the profile of the top portion 134 of the sleeve 130 thereby enabling the fence 56 to be pulled up and removed from the fence 54. The cover plate 160 also has a downwardly directed tab 174 that fits into a hole 176 on the upper fence 56. This prevents the cover plate 160 from moving due to vibration. To rotate the cover plate 160 so the upper fence 56 can be removed, the user must provide both a rotational force as well as a slight upward force to do so.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. An adjustable fence assembly for use with a power tool, comprising:

an elongated lower fence for attachment to the power tool, said lower fence having a base with an upper support and locking surface configuration extending along a substantial portion of the length of said base and a vertical front face for positioning a work piece;

an elongated upper fence having a upwardly facing surface angled obliquely relative to said vertical front face and a bottom surface configuration generally opposite said upwardly facing surface for engaging said surface configuration of said lower fence, said upper fence being releasably attached to said lower fence and adjustable relative to said lower fence along its lengthwise direction, said upper fence having a front wall extending vertically upwardly from said upwardly facing surface, said front wall having a front face that is substantially coplanar with said front face of said lower fence when secured thereto; and a locking mechanism carried by said lower fence and having a locking surface for operatively engaging said upwardly facing surface for selectively applying at least a downward force and a face biasing force for securing said upper fence to said lower fence in a manner whereby a coplanar relationship of said front faces of said upper and lower fence is substantially assured;

wherein said locking mechanism further comprises a sleeve having a head receiving top portion and a non-circular shank portion, said shank portion fitting within a similarly shaped non-circular hole in said lower fence to prevent rotation by said sleeve in said hole;

a threaded bolt having a head that fits into said head receiving top portion which prevents rotational movement of said bolt, said bolt having a cylindrical shank with at least a threaded end that extends through said sleeve, said upper fence and said lower fence; and a lever with a threaded portion for engaging said threaded end, rotation of said lever to a locked position pulls said fences toward one another to apply said downward and face biasing force for securing said upper fence to said lower fence, and rotation to an unlocked position permits said upper fence to be released for movement relative to said lower fence.

2. An assembly as defined in claim 1 wherein said lower fence surface configuration has a broad generally horizontal surface that extends substantially the length of said lower support and a transverse rear face generally parallel to and facing away from said front face, said upper fence bottom surface configuration having a broad generally horizontal surface that extends substantially the length of said upper support configured to engage said horizontal surface of said lower fence and a recess portion defined by a vertical face for contacting said rear face of said lower fence when said upper fence is secured to said lower fence, said locking mechanism applying a downward force with a forward component that biases said recess portion toward said rear face when said upper fence is secured to said lower fence.

3. An assembly as defined in claim 2 wherein said coplanar relationship of said front faces of said upper and lower fence exists when said recess portion of said upper fence contacts said rear face of said lower fence in firm engagement.

4. An assembly as defined in claim 3 wherein said threaded bolt has a hexagonal head portion and said head receiving top portion comprises a 12 point socket structure.

5. An assembly as defined in claim 3 wherein said upper fence further comprises an elongated slot extending between said upwardly facing surface and said bottom surface configuration of said upper fence.

6. An assembly as defined in claim 5 wherein said slot has at least one enlarged portion along its length that is larger than said sleeve top portion, said enlarged portion enabling said upper fence to be removed from said lower fence.

7. An assembly as defined in claim 6 further comprising a moveable cover plate configured to cover said enlarged portion of said slot, said cover plate preventing said upper fence from being removed when placed in a locking position.

8. An assembly as defined in claim 7 wherein said cover plate is pivotally attached to said upper fence and is pivotable between locked and unlocked positions.

9. An assembly as defined in claim 8 wherein said pivoting attachment comprises a screw having a head spaced from said cover plate and a compression spring having one end bearing on the underside of said head and an opposite end bearing on said cover plate to provide a biasing force for holding said cover plate in a placed position.

10. An assembly as defined in claim 8 wherein said cover plate has an open slot coextensive with said upper fence slot when said cover plate is in said locked position, the width of the slot being generally the same as the width of said upper fence slot.

11. An assembly as defined in claim 8 wherein said cover plate has a raised handle portion located away from said pivotal attachment.

12. An assembly as defined in claim 7 wherein the upper surface of said upper fence adjacent said slot has a recess for receiving said cover plate, said cover plate has a thin generally flat center portion in which said open slot is located.

13. An assembly as defined in claim 7 wherein said enlarged portion is located at least at one end of said slot.

14. An assembly as defined in claim 3 wherein said sleeve has said noncircular shank portion that fits within a noncircular opening in said lower fence and is constrained against rotation relative to said lower fence, said head receiving top portion being larger than said shank portion to define said locking surface.

15. An assembly as defined in claim 14 wherein said locking surface is approximately at the same angle as said upwardly facing surface of said upper fence.

16. An assembly as defined in claim 14 wherein said lever comprises an enlarged cup shaped end with an inner annular shelf adjacent to and concentric with said threaded portion, said lower fence having a downward extension with an outer annular shelf for engaging said annular shelf of said cup shaped end, said downward extension having an internal recess configured to receive said bolt cylindrical shank and said sleeve shank portion in upper relation to said downward extension.

17. An assembly as defined in claim 16 further comprising a compression spring located in said internal recess having one end bearing upon said downward extension and an opposite end bearing upon said sleeve shank portion to provide an upward biasing force for elevating said sleeve when said lever is moved toward its unlocked position.

18. An assembly as defined in claim 1 wherein said power tool is a miter saw.

19. An adjustable fence assembly for use with a power tool, comprising:

an elongated lower fence for attachment to the power tool, said lower fence having a base with an upper support and locking surface configuration extending along a substantial portion of the length of said base and a vertical front face for positioning a work piece;

an elongated upper fence having a upwardly facing surface angled obliquely relative to said vertical front face and a bottom surface configuration generally opposite said upwardly facing surface for engaging said surface configuration of said lower fence, said upper fence being releasably attached to said lower fence and adjustable relative to said lower fence along its lengthwise direction, said upper fence having a front wall extending vertically upwardly from said upwardly facing surface, said front wall having a front face that is substantially coplanar with said front face of said lower fence when secured thereto;

a locking mechanism carried by said lower fence and having a locking surface for operatively engaging said upwardly facing surface for selectively applying at least a downward force and a face biasing force for securing said upper fence to said lower fence in a manner whereby a coplanar relationship of said front faces of said upper and lower fence is substantially assured; and a moveable cover plate configured to cover a portion of said locking mechanism that is operatively connected to said upper fence, said cover plate preventing said upper fence from being removed when placed in a locking position wherein said locking mechanism further comprises a sleeve having a head receiving top portion and a non-circular shank portion, said shank portion fitting within a similarly shaped non-circular hole in said lower fence to prevent rotation by said sleeve in said hole;

a threaded bolt having a head that fits into said head receiving top portion which prevents rotational movement of said bolt, said bolt having a cylindrical shank with at least a threaded end that extends through said sleeve, said upper fence and said lower fence; and a lever with a threaded portion for engaging said threaded end, rotation of said lever to a locked position pulls said fences toward one another to apply said downward and face biasing force for securing said upper fence to said lower fence, and rotation to an unlocked position permits said upper fence to be released for movement relative to said lower fence.

20. An assembly as defined in claim 19 wherein said cover plate is pivotally attached to said upper fence and is pivotable between locked and unlocked positions.

21. An assembly as defined in claim 20 wherein said pivoting attachment comprises a screw having a head spaced from said cover plate and a compression spring having one end bearing on the underside of said head and an opposite end bearing on said cover plate to provide a biasing force for holding said cover plate in a placed position.

22. An assembly as defined in claim 20 wherein said cover plate has a raised handle portion located away from said pivotal attachment.

23. An assembly as defined in claim 19 wherein said power tool is a miter saw.

* * * * *